US008467901B2

(12) United States Patent
Brogardh

(10) Patent No.: US 8,467,901 B2
(45) Date of Patent: Jun. 18, 2013

(54) CALIBRATION OF A BASE COORDINATE SYSTEM FOR AN INDUSTRIAL ROBOT

(75) Inventor: Torgny Brogardh, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/610,010

(22) Filed: Sep. 11, 2012

(65) Prior Publication Data

US 2013/0006421 A1    Jan. 3, 2013

Related U.S. Application Data

(63) Continuation of application No. PCT/EP2010/053518, filed on Mar. 18, 2010.

(51) Int. Cl.
*G05B 19/18* (2006.01)
*G05B 19/04* (2006.01)

(52) U.S. Cl.
USPC .......................................................... 700/254

(58) Field of Classification Search
USPC .......................................................... 700/254
See application file for complete search history.

(56) References Cited

U.S. PATENT DOCUMENTS

| | | | | |
|---|---|---|---|---|
| 4,982,504 A * | 1/1991 | Soderberg et al. | .............. | 33/502 |
| 5,177,563 A | 1/1993 | Everett et al. | | |
| 5,239,855 A * | 8/1993 | Schleifer et al. | ............... | 73/1.75 |
| 5,528,116 A * | 6/1996 | Snell | ........................ | 318/568.13 |
| 5,687,293 A * | 11/1997 | Snell | ............................. | 700/254 |
| 6,044,308 A * | 3/2000 | Huissoon | ...................... | 700/166 |
| 6,070,109 A * | 5/2000 | McGee et al. | ................. | 700/259 |
| 6,418,774 B1 * | 7/2002 | Brogårdh et al. | ............. | 73/1.75 |
| 6,941,192 B2 * | 9/2005 | Tang et al. | ..................... | 700/254 |
| 7,111,407 B2 * | 9/2006 | Jones | ......................... | 33/366.12 |
| 7,979,159 B2 * | 7/2011 | Fixell | ............................. | 700/251 |
| 8,121,732 B2 * | 2/2012 | Hashimoto et al. | ........... | 700/260 |
| 8,171,650 B2 * | 5/2012 | York et al. | ....................... | 33/503 |
| 8,276,286 B2 * | 10/2012 | Bailey et al. | .................... | 33/503 |
| 8,284,407 B2 * | 10/2012 | Briggs et al. | .................. | 356/614 |
| 2002/0148275 A1 | 10/2002 | Abbe | | |

(Continued)

FOREIGN PATENT DOCUMENTS

WO    2009132703 A1    11/2009

OTHER PUBLICATIONS

International Preliminary Report on Patentability; Application No. PCT/EP2010/053518; Issued; Jun. 22, 2012; 11 pages.

(Continued)

*Primary Examiner* — Khoi Tran
*Assistant Examiner* — Harry Oh
(74) *Attorney, Agent, or Firm* — St. Onge Steward Johnston & Reens LLC

(57) ABSTRACT

A method for calibration of a base coordinate system of an industrial robot in relation to a work area includes:
  mounting a first part of a kinematic coupling which is constrained in the same number of degrees of freedom as the robot, on the robot wrist interface of the robot,
  mounting a second part of the kinematic coupling in the work area,
  moving the robot including the base portion to the work area,
  set the robot in compliant control mode,
  move the first part of the kinematic coupling to mate with the second part,
  storing axis positions of the robot during mating of the kinematic coupling,
  determining the position and orientation of the base portion based on the stored axis positions and a kinematic model of the robot, and on basis thereon calibrating the base coordinate system of the robot.

7 Claims, 10 Drawing Sheets

U.S. PATENT DOCUMENTS

| | | | |
|---|---|---|---|
| 2003/0200042 A1* | 10/2003 | Gan et al. | 702/105 |
| 2004/0251866 A1* | 12/2004 | Gan et al. | 318/568.11 |
| 2004/0254677 A1* | 12/2004 | Brogardh et al. | 700/245 |
| 2008/0028824 A1* | 2/2008 | Brogardh et al. | 73/1.75 |
| 2008/0114494 A1* | 5/2008 | Nixon | 700/254 |
| 2008/0252248 A1* | 10/2008 | Lundberg et al. | 318/572 |
| 2009/0076655 A1 | 3/2009 | Blondel et al. | |

OTHER PUBLICATIONS

International Search Report and Written Opinion of the International Searching Authority; Application No. PCT/EP2010/053518; Issued: Sep. 8, 2010; Mailing Date: Oct. 6, 2010; 11 pages.

* cited by examiner

CALIBRATION OF A BASE COORDINATE SYSTEM FOR AN INDUSTRIAL ROBOT

CROSS-REFERENCE TO RELATED APPLICATIONS

The present application is a continuation of pending International patent application PCT/EP2010/053518 filed on Mar. 18, 2010 which designates the United States and the content of which is incorporated herein by reference.

FIELD OF THE INVENTION

The present invention relates to a method for calibration of a base coordinate system of a robot in relation to a work area.

The present invention also relates to a kinematic coupling for calibration of a base coordinate system of a robot.

BACKGROUND OF THE INVENTION

The invention is particularly useful for calibration of a portable robot. With a portable robot is meant a robot which is mobile of its own or is movable by other means, such as a truck. A work area is a place at which the robot shall carry out work, for example, a robot cell. For example, the work area includes work objects and/or workstations on which the robot is to carry out work.

A robot includes a base portion and a plurality of parts movable relative the base portion. A base coordinate system is defined in a fixed relation to the base portion. During calibration of the base coordinate system, the position and orientation of the base coordinate system, and accordingly the position and orientation of the base portion, is determined in relation to the work area.

A common situation, especially in smaller enterprises, is that robot automation is not affordable because robots can not move between different machines as flexible as a human worker. Sometimes it is possible to mount the robot hanging on linear guide ways or standing on floor-mounted guide ways, but this kind of solution is expensive and can be difficult to install in the workshop. What is instead needed in this type of situations is a low cost portable robot easy to move between different robot cells and where time needed to get the production running after the movement of the robot is very short. Another application of such a robot solution is in cases with large work objects, where the robot must be moved between different parts of the work objects. A problem with moving a robot between different work areas is that the position and orientation of the robot with respect to the work area must be determined with a high accuracy each time the robot has been moved to a work area. Concepts presented so far to solve this problem are too complicated with special docking mechanisms, docking sensors and even navigation systems. There is also the cost problem when too complex platforms are used, including safety sensors, high precision docking mechanisms, docking sensors etc. The most important reason why portable robots have not yet been introduced is that the concepts presented so far do not solve the problem of how to reduce the time between the docking of the robot and the execution of the robot programs.

A basic problem in robot installations and commissioning of robot cells is the identification of the relation of the robot to a work piece to be processed by the robot. The robot is supposed to perform work on the work piece and the work piece is located in the working range of the robot. The reason for the work piece identification is to define a local coordinate system in the work piece that can be used for programming the robot to perform work on the work piece. WO2009132703 discloses a method for calibration of a local coordinate system relative a robot coordinate system. A sphere is mounted on the robot and at least 3 mating targets on the local object. Each mating target includes two or three nonparallel plane surfaces arranged to receive the sphere so that the sphere is in contact with the surfaces. By moving the robot to mate the sphere with the three targets in a sequence it is possible to calculate the local coordinate system in relation to the robot coordinate system. Force control is exemplified as a possibility for making the mating. This method is difficult to use for the calibration of the base coordinate system of a robot on a movable platform for the following reasons:

When the robot has got a new pose it is difficult to adjust the robot calibration program to mate the sphere with the three targets since these are distributed in the robot cell.

After a movement of the robot there is a large risk that the robot will not be able to reach all the three targets.

Since a fairly large distance is needed between the targets the robot inaccuracy will always degrade the calibration.

At each mating the robot tool can have any orientation, which further reduces the accuracy of the method when used for base coordinate system calibration.

Using lead through for making the mating, which is the most intuitive method, it will be very difficult and sometimes impossible to move the sphere to the three targets.

For portable robots, the method in WO2009132703 is very difficult to use and is actually not developed for robot base coordinate system calibration but for the calibration of work objects and fixtures.

SUMMARY OF THE INVENTION

One object of the present invention is to provide a fast and accurate calibration of a base coordinate system of a portable robot.

According to one aspect of the present invention, this object is achieved by a kinematic coupling.

The kinematic coupling may include a first and a second part movable relative each other, wherein one of the parts is designed to be carried by the robot and the other part is designed to be positioned in the work area of the robot, and one of the parts is provided with a first convex surface and the other part is provided with a recess designed to receive the first convex surface and the recess includes three non parallel plane surfaces designed to simultaneously be in contact with the first convex surface during calibration of the robot. One of the parts may include a second convex surface and the other part may include a fourth plane surface designed to be in contact with the second convex surface at the same time as the first convex surface is in contact with said three plane surfaces during calibration of the robot.

One of the parts may be arranged fixed in the work area and the other part mounted on the robot, preferably on the wrist of the robot. When the coupling is mated, the first convex surface has three contact points with the plane surfaces and the second convex surface has one contact point with the fourth plane surface, which makes a total of four contact points, which constrains the parts in four degrees of freedom. Thus, the first and second parts are designed so that when they are mated to each other the parts are locked to each other in four degrees of freedom.

In order to unambiguously define a unique position and orientation of the robot, the kinematic coupling should constrain the mating parts of the coupling in the same number of degrees of freedom as the degrees of freedom of the robot. The above described kinematic coupling locks the robot in four degrees of freedom and accordingly is suitable for calibrating a robot movable in four degrees of freedom.

An advantage with using a kinematic coupling is that the part of the coupling positioned on the robot only has to be mated once with the other part of the coupling positioned in the work area in order to determine the position and orientation with the same degrees of freedom as for the robot of the base coordinate system of the robot in relation to a work area. This makes the calibration fast and easy. A further advantage with the specific kinematic coupling described above is that the mating can be made stepwise with well defined movements in each step. This is especially important when force- or compliance control is used during the mating. Compliance control can be used for automatic mating controlled by a robot program (optionally including a search strategy) or for manual mating using lead through of the robot tool. Since the mating is made in only one robot pose, the global kinematic errors will not affect the calibration, only relative kinematic errors in a small area (corresponding to the placement differences of the robot) will be of importance. It should also be mentioned that it is easy to find a place in the cell for the kinematic coupling in such a way that it can be reached by the robot and that it can be easy to reach by the operator when lead through calibration is made.

According to an embodiment of the invention, the part including the second convex surface also includes a third convex surface, and said fourth plane surface is designed to simultaneously be in contact with the second and third convex surface at the same time as the first convex surface is in contact with said three plane surfaces during calibration of the robot. The kinematic coupling according to this embodiment of the invention locks the robot in five degrees of freedom and accordingly is suitable for calibrating a robot movable in five degrees of freedom. This kinematic coupling has the same advantages as the previously described kinematic coupling for four degrees of freedom.

According to an embodiment of the invention, one of the parts includes a fourth convex surface, and the other part includes a fifth plane surface designed to be in contact with the fourth convex surface at the same time as the first convex surface is in contact with said three plane surfaces and the second and third convex surface are in contact with the fourth plane surface during calibration of the robot, and the fourth and fifth surfaces are non parallel. The kinematic coupling according to this embodiment of the invention locks the robot in six degrees of freedom and accordingly is suitable for calibrating a robot movable in six degrees of freedom. This kinematic coupling has the same advantages as the previously described kinematic couplings for four and five degrees of freedom.

According to another aspect of the invention this object is achieved by the method for calibration of a base coordinate system of an industrial robot.

The robot may have a base portion and is movable in at least four degrees of freedom with respect to the base portion. The method may comprise:
  mounting a first part of a kinematic coupling which is constrained in the same number of degrees of freedom as the robot, on robot wrist interface of the robot,
  mounting a second part of the kinematic coupling in the work area,
  moving the robot including the base portion to the work area,
  set the robot in compliant control mode,
  move the first part of the kinematic coupling to mate with the second part,
  storing axis positions of the robot during mating of the kinematic coupling,
  determining the position and orientation of the base portion of the robot based on the stored axis positions and a kinematic model of the robot, and on basis thereon calibrating the base coordinate system of the robot.

A robot wrist interface is a part of the wrist on which a tool can be mounted, and is, for example, termed a wrist flange, a tool flange, or a mechanical tool interface.

The kinematic coupling should be constrained in the same number of degrees of freedom as the robot. This means that, for example, for a 4-axis robot a kinematic coupling constrained to four degrees of freedom should be used. Thus, when the first part of the kinematic coupling is moved to mate with the second part four degreases of freedom of the movable part of the robot is defined. For a 5-axis robot a kinematic coupling constrained to five degrees of freedom should be used. Thus, when the first part of the kinematic coupling is moved to mate with the second part five degreases of freedom of the movable part of the robot is defined. For a 6-axis robot a kinematic coupling constrained to six degrees of freedom should be used. Thus, when the first part and second part of the kinematic coupling are mated to each other six degreases of freedom of the movable part of the robot is defined.

For portable robots this invention solves both the problem of start up time and the problem of high platform cost. By means of a new low cost, very easy to use, fast, reliable, and robust calibration method for the base coordinate system of the robot, the robot program can be started up very soon after the docking, which is made without the use of any sensors or advanced mechanical docking mechanism. The robot can even be placed anywhere in relation to the work object or tools, just by placing the robot platform on the floor.

According to the invention, the calibration is made in only one pose using a kinematics coupling. The mating is made by lead through, which is intuitive and easy to use for the robot programmer. The proposed calibration method is much faster, more accurate, more robust and safer than the one described in WO2009132703. Due to the fact that the calibration is made in only one pose, using a kinematics coupling, the method becomes very accurate.

According to an embodiment of the invention, the method further comprises:
  programming the robot in the calibrated base coordinate system, thereby creating a robot program including information on the base coordinate system,
  moving the robot including the base portion to a second position in the robot cell,
  setting the robot in compliant control mode,
  moving the first part of the kinematic coupling to mate with the second part to define at least four degreases of freedom of the movable part of the robot,
  storing the axis positions of the robot during mating of the kinematic coupling, and
  calculating the new position and orientation of the base coordinate system based on the stored axis positions and a kinematic model of the robot, and
  updating the robot base coordinate system in the robot program.

The invention makes it quick and easy to recalibrate the base coordinate system of a portable robot after it has been used in another work area and is returned to the present work area. Accordingly, it is not necessary to put the base portion of the robot in exactly the same position and orientation each time the robot is moved back to the work area. The placement of the robot can be made without any requirements on accuracy since the difference in position and orientation of the robot base coordinate system will be compensated for. The robot base portion can be placed directly on the floor without any docking mechanism. No docketing sensors or navigation systems are needed.

According to one embodiment of the invention, the first part of the kinematic coupling is moved by lead through to mate with the second part. This is a simple and intuitive and method for moving the robot.

The invention is useful for calibration of the base coordinate system of a portable robot. However, the invention can also be used for calibration of a stationary robot when it is exchanged with another robot. For example, when a defect robot is exchanged with a new robot it is necessary to check that the new robot is mounted in a correct position. The present invention can also in this case be used to calibrate the base coordinate system of the new robot.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1:
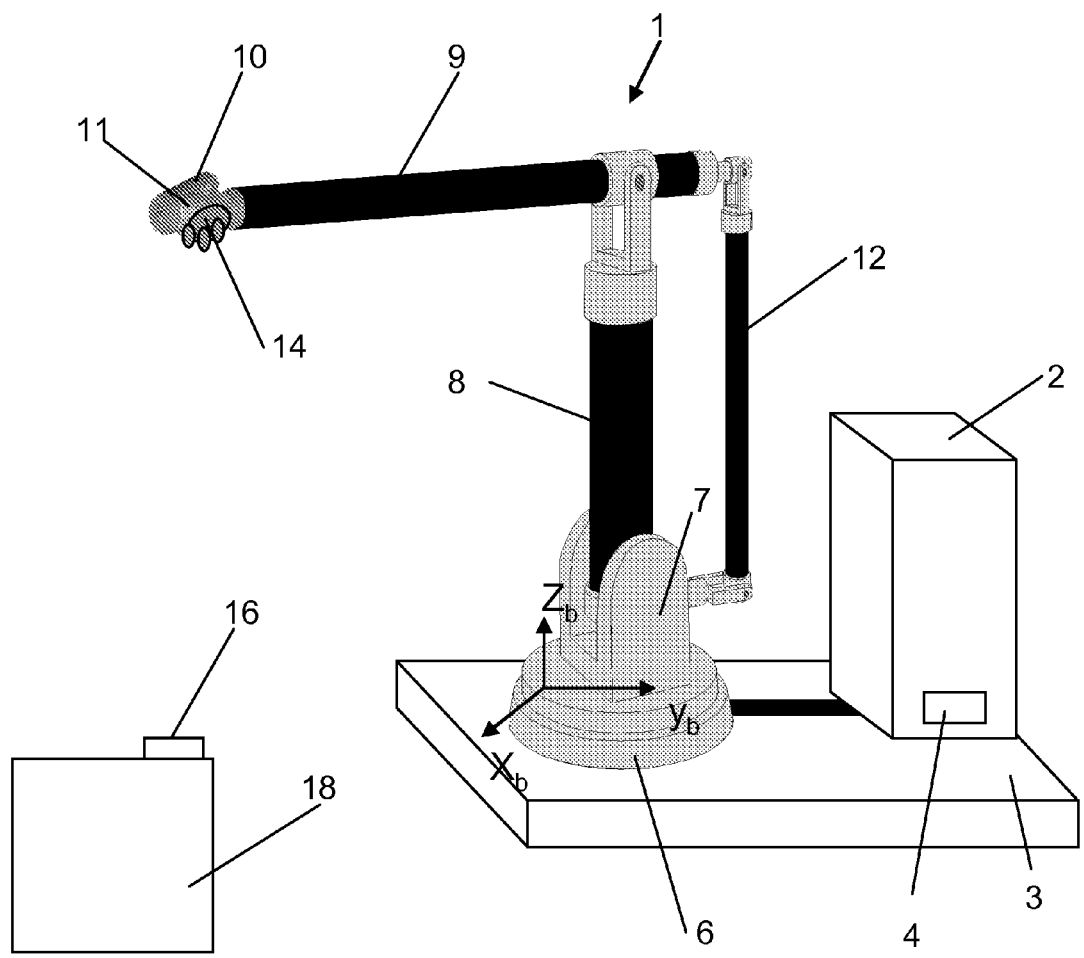
FIG. 1 shows an example of a portable robot using a kinematic coupling for calibration of the base coordinate system of the robot.

FIG. 1 exemplifies a portable robot, where a lightweight robot 1 including a robot controller 2 is mounted on a movable platform 3. The portable robot is located in a robot cell which defines a work area for the robot. The robot controller 2 is also mounted on the platform but there are cases when each robot cell may have its own controller and then only the robot will be on the platform. The robot 1 is connected to the controller 2 by a cable and at docking a contact 4 is used to electrically connect the robot, tools, and the controller to the cell. The robot comprises a stationary base part 6, which supports a stand 7 that is rotatable about a first axis. The stand 7 supports a lower arm 8 that is rotatable about a second axis. The lower arm 8 supports an upper arm 9, which is rotatable about a third axis. The upper arm 9 supports a wrist 10 that is rotatable about a fourth, a fifth and a sixth axis. The wrist 10 supports a wrist interface 11 in the following named a wrist flange on which a tool can be mounted. The robot further comprises a parallel bar transmission 12. This robot has 6 DOF (Degrees Of Freedom). A base coordinate system $X_b, Y_b, Z_b$ is defined in the base part.

By means of a lightweight wrist it is possible to obtain an arm system with a very low inertia and weight. Thus, the upper arm, the lower arm and the parallel bar transmission 12 are made of lightweight carbon reinforced epoxy tubes. Low arm inertia means smaller motors and gear boxes for the main axes of the robot and simultaneously the mass of the main axes structure and the base part of the robot can be significantly reduced. In all, the dynamic forces and torques on the platform will be low using such a robot with very low arm inertia and for many applications it will be enough just to place the platform 3 directly on the floor without any clamping mechanism. To ensure that the platform will not move because of the movements of the robot arms, extra weight can be added to the platform and if necessary high friction pads can be mounted on the bottom of the platform to increase the friction between the platform and the floor and to give the platform a not redundant connection to the floor. In cases this is not enough very simple clamping screws can be adopted with no requirements on the accuracy of the placement of the platform. To move the platform between work areas a fork lifter, retractable wheels or an air film arrangement can be used.

What makes programming easy together with the simple arrangements for moving and placing the platform is the use of a kinematic coupling. The kinematic coupling is used in order to calculate deviations of the position and orientation of the base coordinate system from its position and orientation at programming. The kinematic coupling includes two parts 14, 16 designed to mate each other. One part 14 of the kinematic coupling is mounted on the robot, such as on the wrist 10 of the robot, preferably mounted on the side of the wrist flange in such a way that it is not an obstacle for the tool mounted on the wrist flange. The other part 16 of the kinematic coupling is mounted in the robot cell, for example, on a work station 18 as shown in FIG. 1. For a 6 DOF robot the traditional kinematic coupling locking 6 DOF according to FIG. 2 can be an option.

Figure 2:
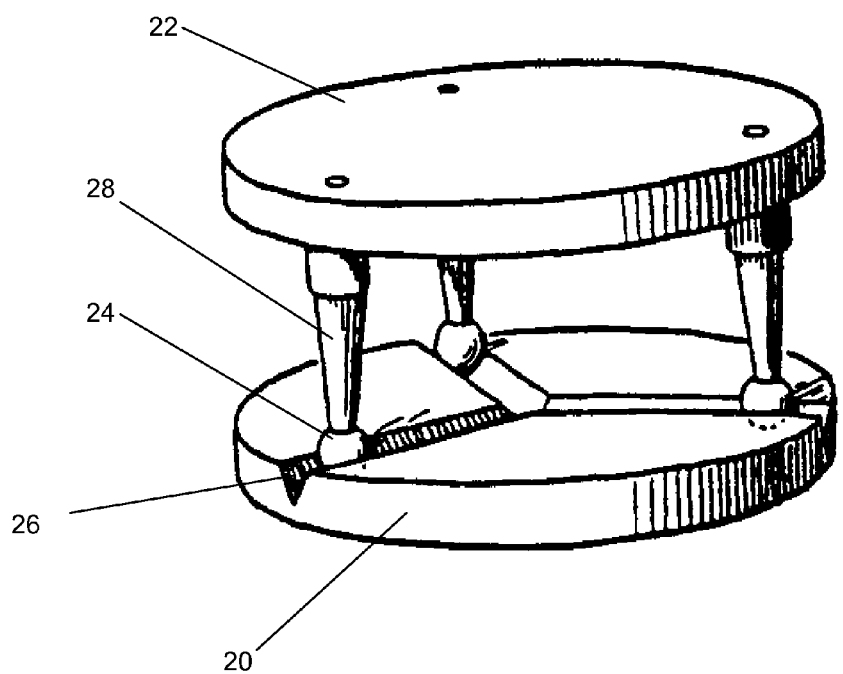
FIG. 2 shows an example of a prior art kinematic coupling.

FIG. 2 shows an example of a prior art kinematic coupling including a first part 20 and a second part 22 arranged movable relative the first part and arranged to mate the first part. The second part 22 is provided with three balls 24 and the first part is provided with three grooves 26. During mating of the parts, the balls 24 are placed in the grooves 26 in such a way that each ball is in contact at two points with its groove. In this way the position and orientation of the plate 22 will be obtained with high precision in relation to the position and orientation of the plate 20. In the figure the balls 24 are mounted on pins 28 in order to show the functionality. Usually the balls are parts of the plate 22 with no extending pins. In the figure the groves are symmetrically arranged on the plate 20 and thus separated by an angle of 120 degrees. If this kinematics coupling concept is used for the calibration of the base coordinate system the symmetry should be avoided to avoid that an error in the coupling connection of a multiple of 120 degrees is achieved. Instead the angles between the grooves could be for example 90, 135, and 135 degrees.

Traditionally, a robot controller of an industrial robot is provided with servo controllers for controlling the positions of the motors driving the motion of the robot. The servo controller comprises a position control loop configured to calculate speed references based on a position error. The position error is multiplied by a constant denoted the position control gain $K_P$. The strength of the position control depends on the value of the position control gain. The servo controller further comprises a speed control loop configured to calculate a speed error based on the difference between the speed references from the position controller and speed measurements, and further to calculate torque references for the motor based on the speed error multiplied by a constant denoted the speed control gain $K_V$. The strength of the speed control depends on the value of the speed control gain. During normal operation of the robot, the gain of the position loop and the speed loop are set at a high value such that the robot is stiff in all directions and orientations. Many robots have been provided with the possibility to switch the robot into a compliance control mode. In the compliance control mode the gains of the position loop and the speed loop are significantly reduced and the robot becomes soft or compliant.

A technique called lead-through programming has been recognized as a very convenient way of programming robots. During lead-through programming, the programmer moves the tool or work object mounted on the robot by hand to positions along the robot path to be programmed, and records the motions into a memory in the robot controller.

The robot controller is switched into a compliant control mode, in which the robot has a reduced stiffness in at least one of the axes or in at least one Cartesian direction or orientation, before the calibration begins. Thereafter the robot is programmed by means of lead-through of the robot at the same time as the controller is in the compliant control mode. By switching the robot into the compliant control mode the robot is made compliant and easy to move by hand.

The calibration procedure according to the invention will then be:

1. When programming the robot the platform 3 with the robot is moved into a suitable position in the robot cell making it possible to reach all positions to be programmed.

2. The platform is placed on the floor (in the simplest case just by setting it down without any clamping).

3. The controller 2 is connected to the cell power and electronics.

4. The robot controller is ordered to switch to compliant control mode, for example with gravity compensation, and the operator moves the first part 14 of the kinematics coupling to get in 6 points contact with the cell-mounted fixed part 16 of the kinematics coupling. When in full contact the robot controller is ordered to register the axis positions of the robot and to calculate from a kinematic model of the robot the position and orientation of the base coordinate system of the robot in relation to a world coordinate system. In cases when no world coordinate system is defined, the tool coordinate system at the time of the registration of the joint positions can be used as a world coordinate system. The programmer then does not need to bother about any definition of a world coordinate system.

Figure 3:
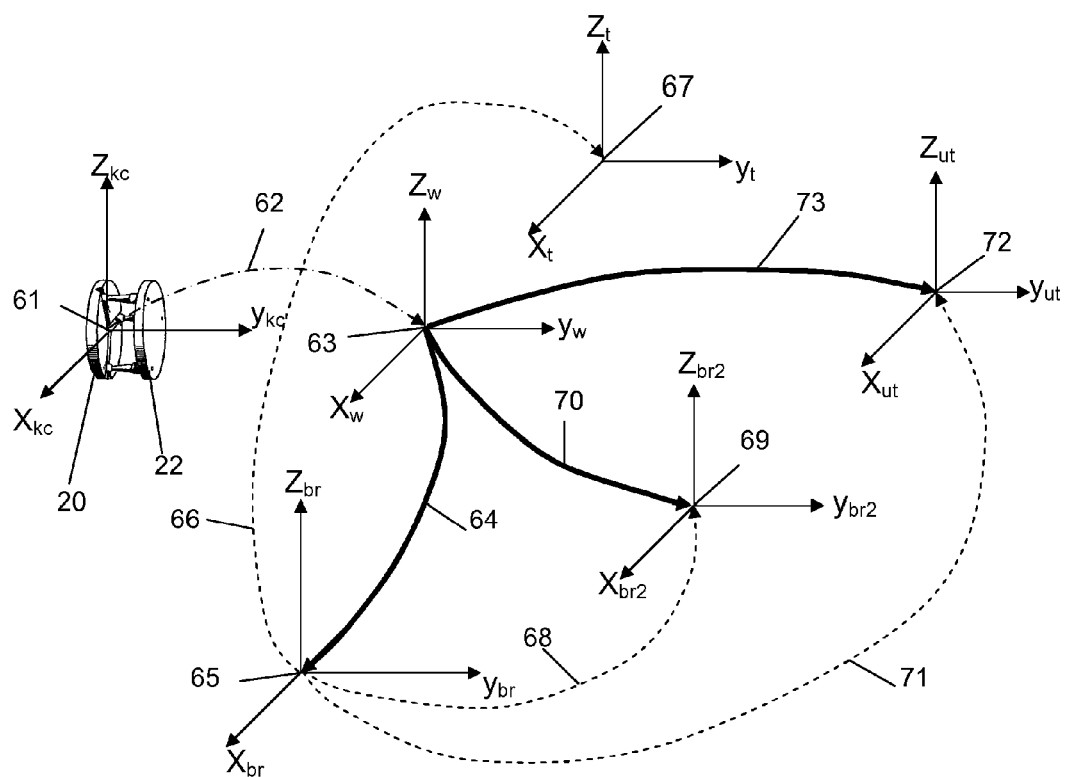
FIG. 3 shows examples of coordinate systems that can be involved in the calibration.

5. If there are tables, fixtures, jigs, room fixed tools, robot fixed tools or optional robots that need to be calibrated this is made after the definition of the robot base coordinate system. The robot can then be used for the definition of the different coordinate systems defining the optional equipment. FIG. 3 outlines an example of some coordinate systems that can be involved and according to this figure the calibration procedure in steps 4 and 5 can be explained: The left cell-mounted fixed part of the kinematic coupling defines a fixed kinematics coupling coordinate system 61, which will be the reference for all calibration-activities in the robot cell. A wrist flange coordinate system 63 is defined in fixed relation to the wrist flange.

When the robot wrist-mounted part 14 of the kinematic coupling is in 6 DOF contact with the fixed part 16, the wrist flange coordinate system 63 obtains a position and orientation accurately related to the fixed kinematics coupling coordinated system 61. Since the wrist flange coordinate system 63 is defined by the robot manufacturer, the world coordinate system can be automatically set to the wrist flange coordinate system 63 (in relation to the robot base coordinate system in accordance with the kinematics model of the robot) when the kinematics coupling is in 6 DOF contact. The coordinate system of the kinematics coupling 61 and the relation 62 between the coordinate systems 61 and 63 are then not needed as long as the robot wrist fixed kinematics coupling part 14 always has a fixed relation to the tool flange of the robot. Thus, the world coordinate system 63 can be defined and by means of the kinematics 64 the base coordinate system of the robot can be calculated at the time of cell calibration and robot programming.

Now, releasing the kinematics coupling, the robot can be used to calibrate a tool coordinate system 67 with relation 66 to the robot base coordinate system 65 and thus in the fixed relation to the tool flange coordinate system. Moreover, the kinematics of the robot 68 can be used to calibrate the base coordinate system 69 of another robot. Since the relations 64 and 68 are then known, the relation 70 of the base coordinate system 69 in relation to the world coordinate system 63 can be calculated. In the same way the robot can be used to relate any coordinate system in the cell to the world coordinate system 63. As an example the relation 73 can be calculated from the relations 66 and 71 after the calibration of a user coordinate system using the robot.

After the calibration activity in step 4 and optionally the cell calibration activities in step 5, the robot programs are made and tested, either on line or off line, in the later case including touch up if needed. The programs are then usually made in object coordinate systems related to user coordinate systems, which in turn can be related to base coordinate systems of optional robots in the cell. As shown in FIG. 3 all of these coordinate systems are at the end related to the world coordinate system 63, making it possible to run the programs with another base coordinate system of the robot, only the other base coordinate system of the robot has been calculated in relation to the world coordinate system at a mating of the kinematics coupling 14,16. It should here be mentioned that if the robot and/or the platform reduce the accessibility for the programmer when making a part of the program it is possible to move the platform to increase the accessibility for the programmer. After the robot has been moved, the controller is set to compliant mode, a mating is made of the kinematics coupling 20,22, the angles of the robot axes are measured internally in the controller and from the known kinematics of the robot, the controller recalculates the base coordinate system of the robot 65 in relation 64 to the world coordinate system 63 and new programmed points can be calculated correctly in the world coordinate system with the new relation 64.

After programming, the manufacturing is started in the cell and program touch up with respect to the performed process may be made. It is then also possible to move the platform to a position and orientation, which increases the productivity of the cell by, for example, reduction in wrist reorientations because of closeness to singularities. After such a movement of the robot the robot base coordinate system must be updated with a new mating of the kinematics coupling.

When the robot is later needed for another task in the workshop it is moved away and when it is after some time back again, it is moved into the cell and the platform is placed at about the place where it was used the previous time. The controller is then set to compliant control (optionally with gravity compensation) and the wrist is moved to obtain 6 DOF contact between the kinematics coupling parts 20,22. The controller registers the axis positions and calculates by its kinematics model the new robot base coordinate system parameters (position and orientation of 65 in relation to 63). With errors in the kinematics model of the robot and high requirements of the process accuracy it is important not to have too big deviations between the position and orientation of the robot base coordinate system at programming and program execution.

Running in compliant robot control mode means that the robot control loops are set to have low stiffness, preferably with stiffness values calculated in a Cartesian coordinate system. Gravity compensation means that a dynamic model of the robot is used in order to calculate and make feed forward of the gravity forces on the arm system to get the robot arms to float.

It should be mentioned that in cases when a 6 DOF force/torque sensor is used on the robot, compliance control could be used by means of the force sensor loop when running it in impedance control mode.

Figure 4:
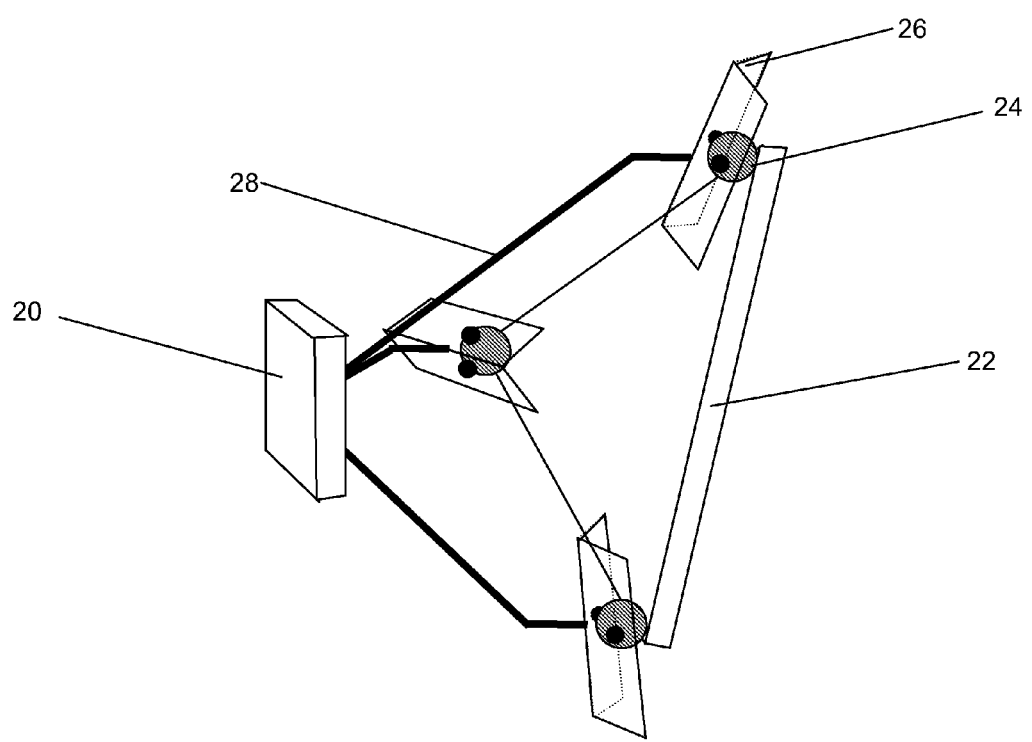
FIG. 4 illustrates the kinematics of the kinematic coupling shown in FIG. 2.

The method described for fast robot base coordinate system calibration requires that the mating of the two kinematics coupling parts is complete. FIG. 4 illustrates the kinematics of the kinematics coupling shown in FIGS. 2 and 3. The part 22 is equipped with three balls 24 and at complete mating each ball is in contact with the groove 26 of the other part 20 at two points. Since the three grooves are rigidly connected to the part 20 by means of pins 28, the position and orientation of the part 22 in relation to 20 is completely defined without any redundancy. However, when making the manipulation during compliant robot control position and orientation of part 22 in relation to part 20 must be manipulated simultaneously, which is quite tricky. For example, when one of the balls has got in contact with both surfaces of a groove, then the orientation is changed until the other balls get close to their grooves but to get these balls to mate with their grooves both relative position and orientation has to be manipulated and the process must be made iteratively until full mating is obtained. Moreover, friction could give errors in the mating since it is not easy to check that all 6 point contacts have been obtained. Therefore kinematics couplings better suited for mating with compliant control should be found.

Figure 5:
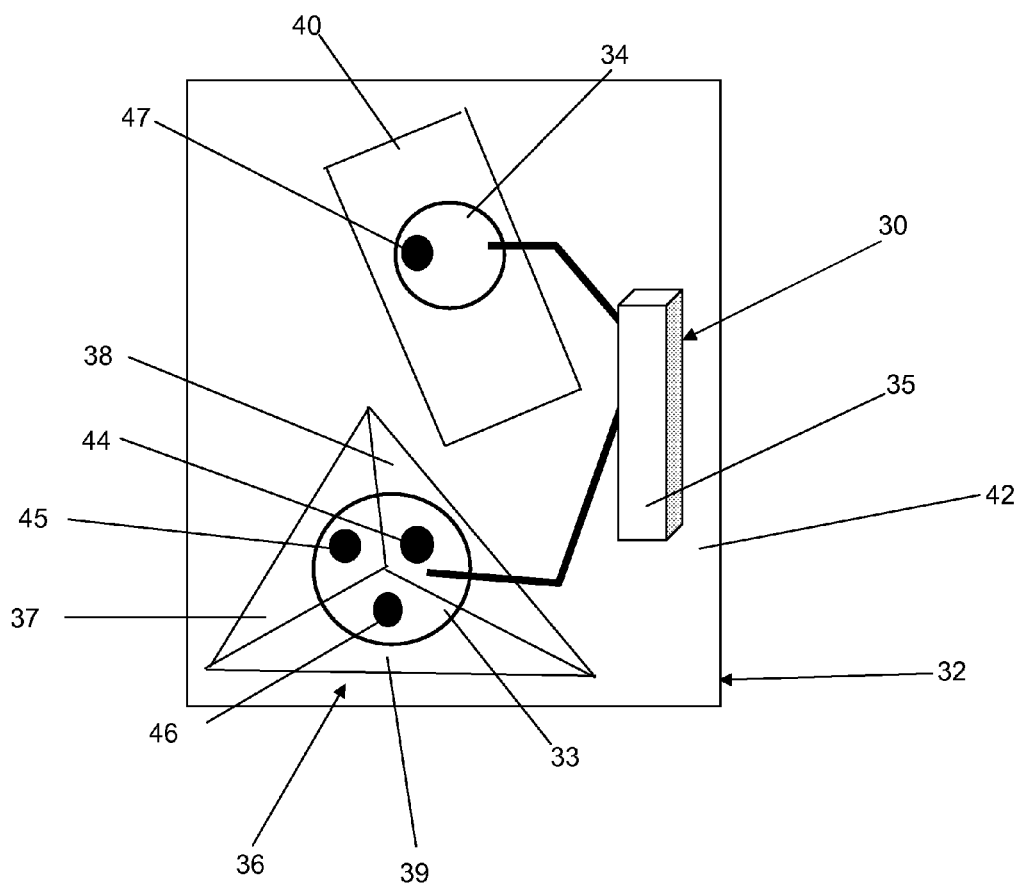
FIG. 5 shows an example of a kinematic coupling according to the invention for calibration of a 4 degrees of freedom robot.

FIG. 5 shows a 4 DOF kinematic coupling for calibration of a base coordinate system of an industrial robot, in which the position manipulation can be made independent of the orientation manipulation, which makes the mating easier and faster. The coupling in this figure is useful when a 4-axes robot is used. The kinematic coupling includes a first part 30 and a second part 32 movable relative each other, wherein one of the parts is designed to be carried by the robot and the other part is designed to be positioned in the work area of the robot. The first part 30 is provided with a first ball 33 having a first convex surface and a second ball 34 having a second convex surface. The balls 33 and 34 are mechanically connected to a coupling plate 35. The second part 32 is provided with a recess 36 designed to receive the first ball 33. The recess 36 includes three non parallel plane surfaces 37,38,39 designed to simultaneously be in contact with the first ball 33 during calibration of the robot. The second part 32 is further provided with a fourth plane surface 40 designed to be in contact with the second ball 34 at the same time as the first ball 33 is in contact with said three plane surfaces during calibration of the robot. The surfaces 37, 38, 39 and 40 are parts of a second coupling plate 42. The coupling is mated when the balls 33, 34 are in contact at 4 points with the surfaces 37, 38, 39 and 40.

During the mating at compliant robot control (using lead through of the wrist flange or programmed robot control) the ball 33 is at first moved into the recess 36 to get a 3 points 44,45,46 contact between the surfaces 37,38,39 and the ball 33. When the ball 33 is in the recess, the orientation of the wrist flange is manipulated, while the ball 33 is kept in the 3 points contact in the recess, until the ball 34 is in contact with the surface 40 in a contact point 47.

Figure 6:
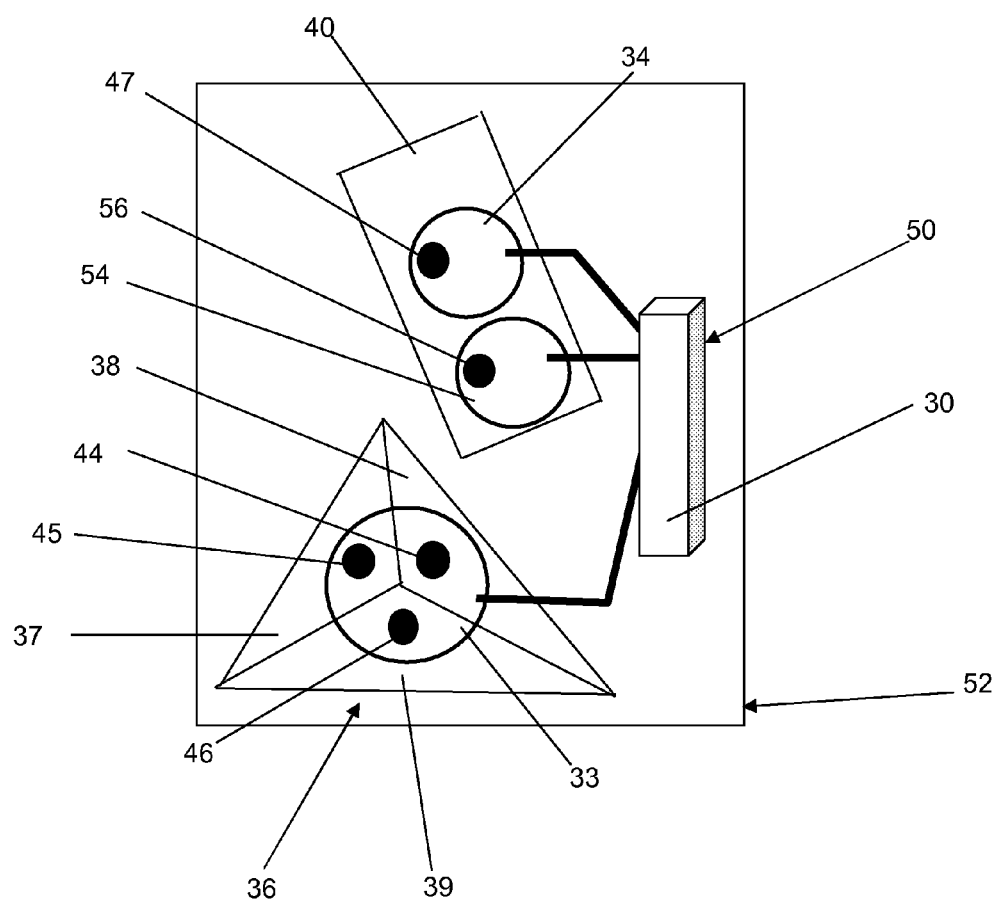
FIG. 6 shows an example of a kinematic coupling according to the invention for calibration of a 5 degrees of freedom robot.

FIG. 6 shows a 5 DOF kinematic coupling for calibration of a base coordinate system of an industrial robot in, in which the position manipulation can be made independent of the orientation manipulation, which makes the mating easier and faster. This coupling is useful when a 5-axes robot is used. The kinematic coupling includes a first part 50 and a second part 52 movable relative each other. In addition to the features of the 4 DOF kinematic coupling shown in FIG. 5, the first part 50 includes a third ball 54 having a convex surface, and said fourth plane surface 40 is designed to simultaneously be in contact with the second and third ball 34,54 at the same time as the first ball 33 is in contact with the three plane surfaces 37,38,39 during calibration of the robot. The first step of the mating is the same as described with reference to FIG. 5. When the ball 33 is in the recess the orientation of the wrist flange is manipulated while the ball 33 is kept in 3 points contact in the planes of the recess 36 until the balls 34 and 54 are both in contact with the surface 40 in the contact points 47 and 56. The reorientation can be made stepwise, for example by at first mate the ball 34 with the surface 40 and then ball 54 with the surface 40. The degree of freedom not locked by the kinematics coupling in FIG. 5 is a rotation around an axis passing through the centre of the ball 33 and where the axis is perpendicular to the surface 40.

Figure 7:
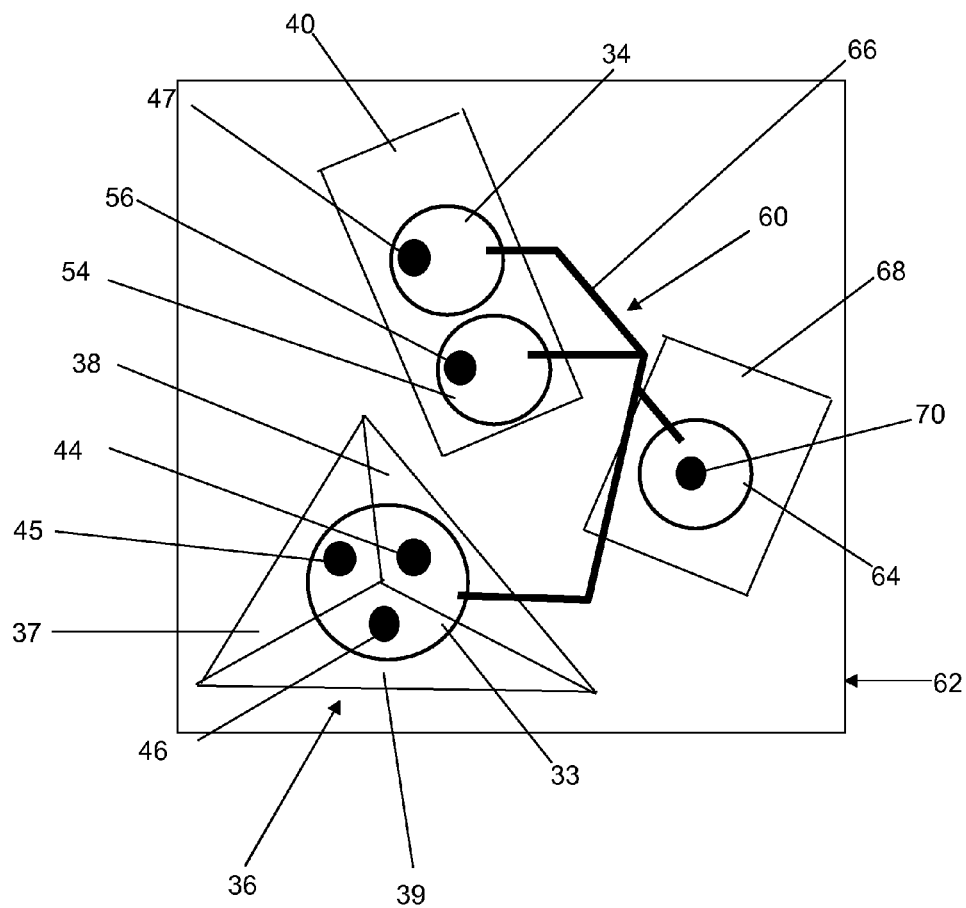
FIG. 7 shows a first example of a kinematic coupling according to the invention for calibration of a 6 degrees of freedom robot.

FIG. 7 shows a 6 DOF kinematics coupling, in which also the position manipulation can be made independent of the orientation manipulation, which makes the mating easier and faster. This coupling is suitable for calibration of a 6-axes robot. The kinematic coupling includes a first part 60 and a second part 62 movable relative each other. In this kinematics coupling the first part 60 includes four balls 33,34,54 and 64, which are mechanically connected to a coupling plate (not shown in the figure) by connection 66. The second part 62 has in addition to the recess 36 and the fourth plane surface 40 a fifth plane surface 68 designed to be in contact with the fourth ball 64 at the same time as the ball 33 is in contact with the three plane surfaces 37,38, and 39 of the recess 36, and the second and third balls 34,54 are in contact with the fourth plane surface 40 during calibration of the robot, The fourth and fifth surfaces are non parallel, advantageously at a right angle to each other. The coupling is mated when the balls 33,34,54,64 are in contact at 6 points with the surfaces 37,38, 39,40 and 68. These surfaces are parts of a second coupling plate 62 of the kinematics coupling.

During the mating at compliant robot control (using lead through of the wrist flange) the ball 33 is at first moved into the 3-facets recess 36 to get a 3 points 44,45,46 contact between the surfaces 37,38,39 and the ball 33. When the ball 33 is in contact with the surfaces of the recess, the orientation of the wrist flange is manipulated (while the ball 33 is kept in 3 points contact in the surfaces of the recess) until the balls 34 and 54 are both in contact with the surface 40 (in the contact points 47 and 56). At last the wrist is rotated, while the ball 33 is kept in 3 points contact with the recess and the balls 34 and 54 in one point contact each with the surface 40, until the ball 64 is in contact with the surface 68 at a contact point 70. The surfaces 40 and 68 must have an angle relative each other, for example 90 degrees.

Figure 8:
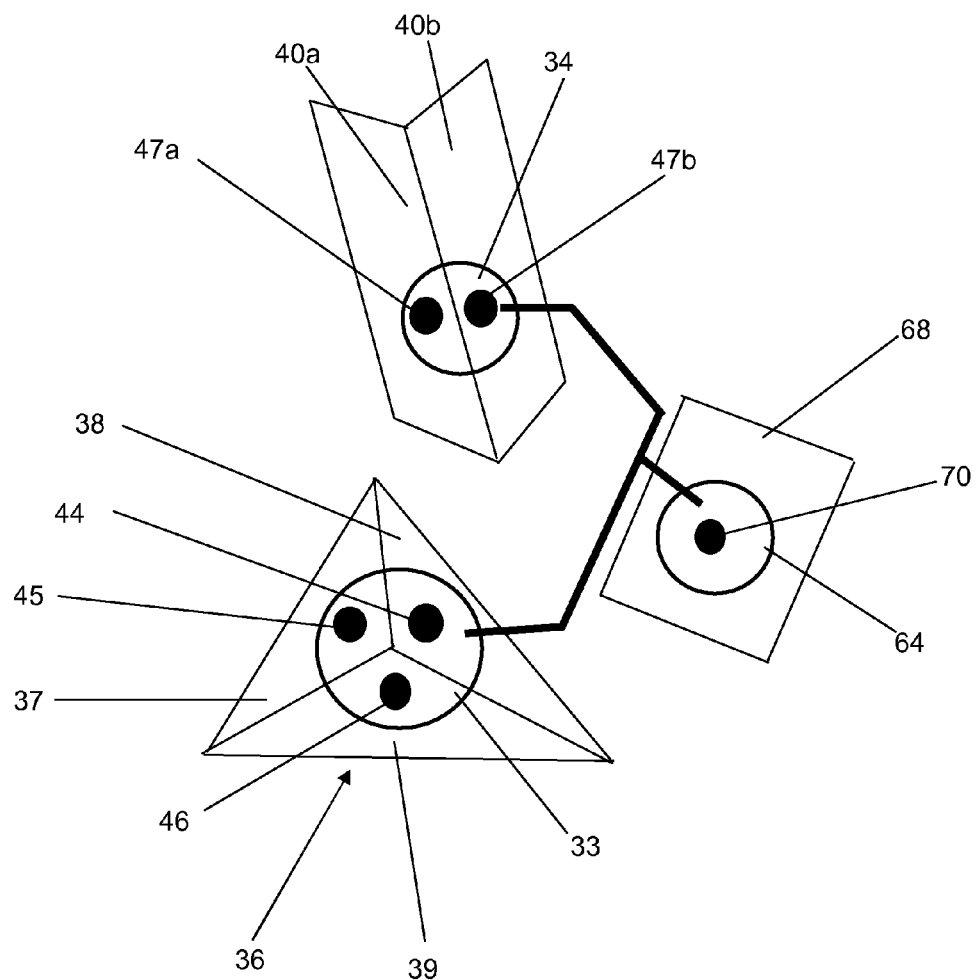
FIG. 8 shows a second example of a kinematic coupling according to the invention for calibration of a 6 degrees of freedom robot.

As an alternative the surface 40 can be replaced by a groove with the surfaces 40a and 40b according to FIG. 8. Then the ball 34 will get in contact at the points 47a and 47b with the surfaces 40a and 40b at mating and only 3 balls 33,34,54 are needed. The mating procedure will now be: Move the wrist until the ball 33 is in contact with the surfaces 37,38,39, reorient the wrist until the ball 34 is in contact with the surfaces 40a-b and reorient the wrist a second time until the ball 64 is in contact with the surface 68.

Notice that it is possible to automate the mating by making a search program in compliant robot mode (for example at admittance control). However, for an installation with large variations in the placement of the platform it will be faster to use lead through, at least to get to a position from where the automatic mating can start.

What is important for the design of the kinematics couplings for this application is that the mating can be made stepwise with well defined movements in each step. As a complement the control can be changed in each step such that it will be easier to maintain contacts for the already mated balls. For example an attractive force and torque in a certain direction/around a certain axis can be generated by the controller.

Figure 9:
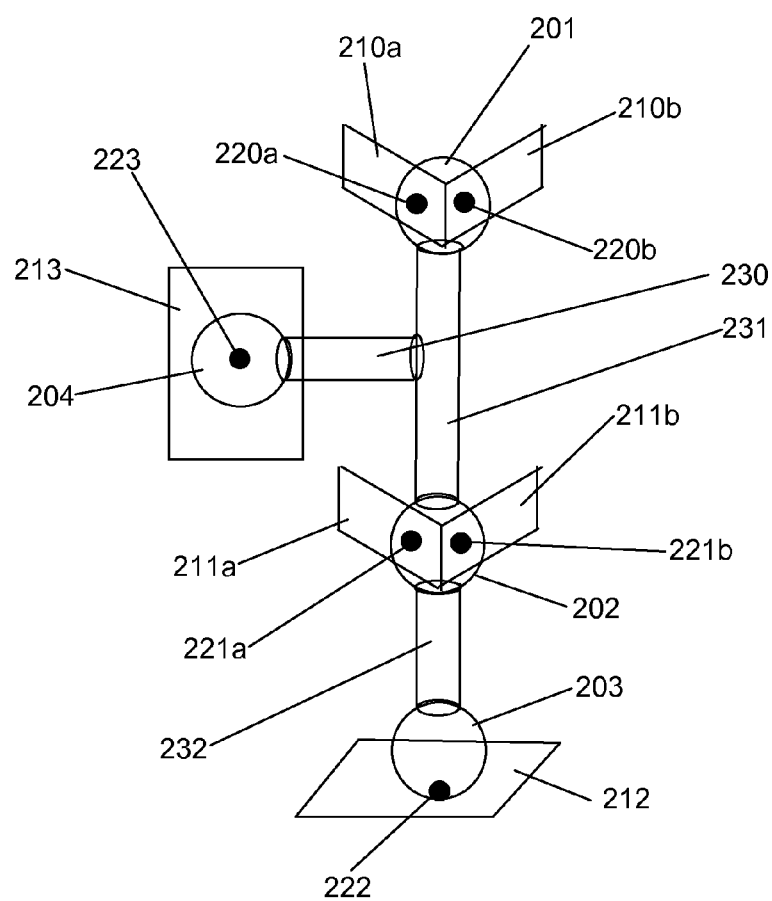
FIG. 9 shows a third example of a kinematic coupling according to the invention for calibration of a 6 degrees of freedom robot.

A useful alternative 6 DOF kinematics coupling where positioning and rotation of the wrist flange is not made independent of each other but where the mating is still easy to perform since it is made stepwise in an intuitive way can be seen in FIG. 9. Here four balls 201-204 are mounted on pins 230-232, which belong to one part of the kinematics coupling. The mating procedure is here the following: The ball 201 is at first mated to a groove 210 (with the angled surfaces 210a and b) in the contact points 220a and b. Then the wrist is reoriented until the ball 202 is mated with the groove 211 (in the contact points 221a and b at the angled surfaces 211a and b) The ball arrangement is then manipulated to slide on the grooves 210 and 211 until the ball 203 gets in contact with the surface 212 in the contact point 222. As a last step the ball arrangement is turned until the ball 204 is in contact with the surface 213 in the contact point 223.

Figure 10:
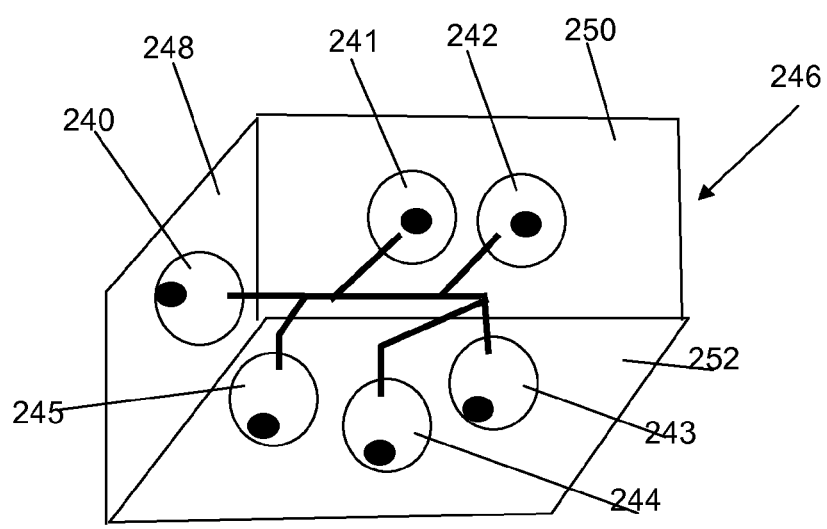
FIG. 10 shows a fourth example of a kinematic coupling according to the invention for calibration of a 6 degrees of freedom robot.

The kinematics coupling configuration shown in FIG. 10 can actually be modified using six balls in order to be used to calibrate the robot to any corner in, for example, a fixture or a work object. Thus, according to FIG. 10, the first part of the coupling includes six balls 240-245. The second part 246 of the coupling has the form of an inner corner and includes three plane surfaces 248, 250, 252. When processing large objects, where the portable robot is moved between different positions to reach the whole object, corners in the work object can be used to calibrate the base coordinate system of the robot at the different robot positions. In arc welding it is quite often the case that box-like structures are welded and then the robot can be calibrated to each box according to FIG. 10. This can also be used for not portable robots in order to calibrate work object coordinate systems, user coordinate systems or tool coordinate systems. Looking at the contact points of FIG. 9 it can be seen that the same situation is obtained as in FIG. 10 if in FIG. 9 the surfaces 210a, 211a and 213 coincide and the surfaces 210b and 211b also coincide. Having an arc welding gun, a configuration as the one in FIG. 9 could be integrated onto the nozzle of the gun to be able to make calibrations directly with the welding gun.

Summing up, it is shown how the base coordinate system of robots with 4-6 DOF can easily and fast be accurately calibrated by running the robot with compliant control and manually manipulate the wrist until full contact has been achieved in a kinematics coupling between the wrist and a fixed part of the robot cell. There are different design possibilities for the kinematics couplings and of these it is an advantage to use couplings, in which the mating can be made stepwise. Examples of couplings have been given to constrain 6, 5 and 4 DOF and mating sequences for the couplings most suitable for calibration purposes have been presented. The main application of the calibration concept is for the placing of portable or mobile robots at its work cells. The procedure how to do this has been described, both with respect to robot platform placement, robot base coordinate system calculation, cell calibration and programming. It has also been mentioned that some of the presented kinematics couplings can be used for the calibration of other coordinate systems than the robot base coordinate system, as exemplified by the tool-, user- and object coordinate systems. For the use of a portable robot on large work object, there are kinematics couplings that can be used for calibrating the robot base coordinate system to the work object, simply by moving the robot-fixed part of the kinematics coupling to a corner in the work object. The same can of course be made for the calibration of the robot base coordinate system to large fixtures and jigs. In these cases the fixtures and jigs can also have kinematics coupling plates mounted on its structure for the robot-mounted kinematics coupling plate to mate with.

What is claimed is:

1. A kinematic coupling for calibration of a base coordinate system of an industrial robot with at least five degrees of freedom in relation to a work area at which the robot shall carry out work, characterized in that the coupling comprises a first part and a second part movable relative each other, wherein one of the parts is designed to be carried by the robot and the other part is designed to be positioned in the work area of the robot, and one of the parts is provided with a first convex surface and the other part is provided with a recess designed to receive the first convex surface and the recess includes three non parallel plane surfaces designed to simultaneously be in contact with the first convex surface during calibration of the robot, one of the parts includes a second and a third convex surface, and the other part includes a fourth plane surface designed to simultaneously be in contact with the second and third convex surface at the same time as the first convex surface is in contact with said three plane surfaces during calibration of the robot.

2. The kinematic coupling according to claim 1, wherein one of the parts includes a fourth convex surface, and the other part includes a fifth plane surface designed to be in contact with the fourth convex surface at the same time as the first convex surface is in contact with said three plane surfaces and the second and third convex surface are in contact with the fourth plane surface during calibration of the robot, and the fourth and fifth surfaces are non parallel.

3. A method for calibration of a base coordinate system of an industrial robot in relation to a work area at which the robot shall carry out work, the robot having a base portion a robot wrist interface movable in at least four degrees of freedom with respect to the base portion, the method comprises:

mounting a first part of a kinematic coupling which is constrained in the same number of degrees of freedom as the robot, on the robot wrist interface of the robot, mounting a second part of the kinematic coupling in the work area, moving the robot including the base portion to the work area, set the robot in compliant control mode, move the first part of the kinematic coupling to mate with the second part to define at least four degrees of freedom of the movable part of the robot, storing axis positions of the robot at mating of the kinematic coupling, determining the position and orientation of the base portion based on the stored axis positions and a kinematic model of the robot, and on basis thereon calibrating the base coordinate system of the robot.

4. The method according to claim 3, wherein the method further comprises:

programming the robot in the calibrated base coordinate system, thereby creating a robot program including information on the base coordinate system, moving the robot including the base portion to a second position in the robot cell, setting the robot in compliant control mode, moving the first part of the kinematic coupling to mate with the second part, storing the axis positions of the robot during mating of the kinematic coupling, and calculating the new position and orientation of the base coordinate system based on the stored axis positions and a kinematic model of the robot, and updating the base coordinate system in the robot program.

5. The method according to claim 3, wherein the first part of the kinematic coupling is moved by lead through to mate with the second part.

6. The method according to claim 3, wherein the kinematic coupling used is a kinematic coupling comprising a first part and a second part movable relative each other, wherein one of the parts is designed to be carried by the robot and the other part is designed to be positioned in the work area of the robot, and one of the parts is provided with a first convex surface and the other part is provided with a recess designed to receive the first convex surface and the recess includes three non-parallel plane surfaces designed to simultaneously be in contact with the first convex surface during calibration of the robot, one of the parts includes a second convex surface and the other part includes a fourth plane surface designed to be in contact with the second convex surface at the same time as the first convex surface is in contact with said three plane surfaces during calibration of the robot.

7. The method according to claim 3, wherein the kinematic coupling used is a kinematic coupling for calibration of a base coordinate system of an industrial robot with at least five degrees of freedom in relation to a work area at which the robot shall carry out work characterized in that the coupling comprises a first part and a second part movable relative each other, wherein one of the parts is designed to be carried by the robot and the other art is designed to be positioned in the work area of the robot, and one of the parts is provided with a first convex surface and the other part is provided with a recess designed to receive the first convex surface and the recess includes three non parallel plane surfaces designed to simultaneously be in contact with the first convex surface during calibration of the robot one of the parts includes a second and a third convex surface, and the other part includes a fourth plane surface designed to simultaneously be in contact with the second and third convex surface at the same time as the first convex surface is in contact with said three plane surfaces during calibration of the robot.

* * * * *